455-606 AU 263 EX
4/5/88 OR 4,736,463

United States Patent [19]
Chavez

[11] Patent Number: 4,736,463
[45] Date of Patent: Apr. 5, 1988

[54] ELECTRO-OPTICALLY CONTROLLED WIDEBAND MULTI-BEAM PHASED ARRAY ANTENNA

[75] Inventor: Joseph D. Chavez, Thousand Oaks, Calif.

[73] Assignee: ITT Corporation, Van Nuys, Calif.

[21] Appl. No.: 899,276

[22] Filed: Aug. 22, 1986

[51] Int. Cl.[4] .......... H04B 9/00
[52] U.S. Cl. .......... 455/606; 455/607; 455/612
[58] Field of Search .......... 455/606, 607, 612

[56] References Cited

U.S. PATENT DOCUMENTS 3,878,520 4/1975 Wright et al. .......... 455/612
4,128,759 12/1978 Hunt et al. .......... 455/612
4,259,746 3/1981 Sandstedt .......... 455/617

*Primary Examiner*—Robert L. Griffin
*Assistant Examiner*—Leslie Van Beek
*Attorney, Agent, or Firm*—Robert A. Walsh; Thomas N. Twomey; Mary C. Werner

[57] ABSTRACT

An optical network (46) for providing a wideband, true time delay phased antenna array (100) with simultaneous multiple beam capability is disclosed. The network (46) is provided for connection between plural beam ports (48–52M) and plural antenna elements (20–24N) for converting a received radio frequency (RF) planar wavefront (10) to plural in-phase signals at one and only one beam port (48–52M) for each respective one of a plurality of directions of wave propagation. The converse is true for a transmitted wave. The network (46) includes a laser (30–34N) for each antenna element (20–24N) or each beam port (48–52N) modulated by RF energy which is separated and delayed via optical dividers (35–39N) connected to optical combiners (40–44M) by optical fibers (46) of different lengths. Substantially all signals then arrive in-phase at one particular beam port (48–52M) for a receiver (56–60M) receiving a wave at one particular corresponding angle. In transmitted waves, appropriate radiations from the phased array (400) differ by an amount to effect transmission in one particular direction corresponding to the beam port (208–212M) selected for energization by the transmitter (218).

21 Claims, 4 Drawing Sheets

FIG. 1
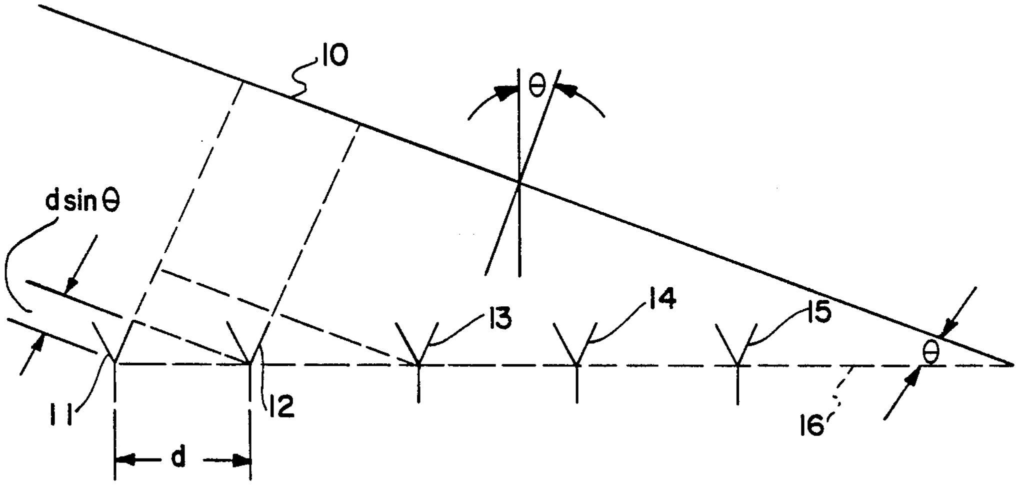
$$\Delta t = \frac{d \sin \theta}{c}$$
FIG. 2
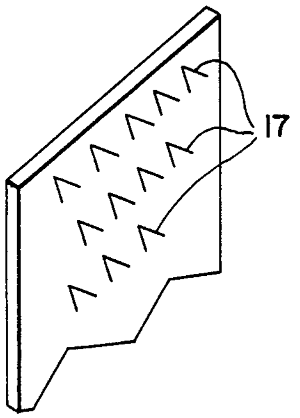
FIG. 3
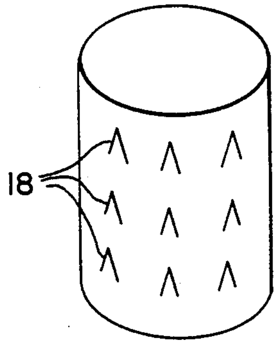
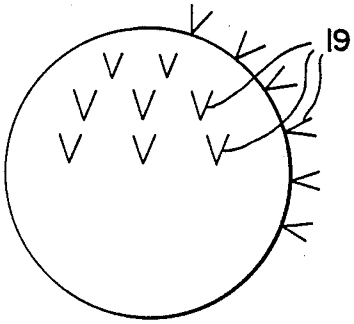
FIG. 4

ELECTRO-OPTICALLY CONTROLLED WIDEBAND MULTI-BEAM PHASED ARRAY ANTENNA

BACKGROUND OF THE INVENTION

This invention relates to phased arrays, and more particularly to an electro-optical network or the like for phasing the antenna array of a radio frequency (RF) transmitter and/or receiver for providing simultaneous multiple beams with true time delay wideband capability.

PRIOR ART STATEMENT

Electro-optical apparatus for phased arrays are known in the prior art. For example, in Wright et al. U.S. Pat. No. 3,878,520 issued Apr. 15, 1975, there is disclosed an optical processing technique employed to optically generate a set of properly phase-controlled signals that are appropriate for forming and steering, in space, a beam from a two-dimensional phased array antenna. The set of properly phase-controlled signals are provided by first generating two optical beams having a differential frequency equal to the desired microwave frequency to be transmitted. The two beams are combined in a controlled manner to produce a two-dimensional optical pattern that contains the correct microwave phase and amplitude information to form and steer the final antenna beam in space. This two dimensional optical pattern is at any instant an optical analog of the microwave excitation applied to the antenna radiating elements. The optical pattern is converted to a two-dimensional microwave pattern in a transducer system called an optical-to-microwave converter, the output of which is a two-dimensional array of microwave signals. These signals are connected to a single radiating element of a phased array antenna. The elements then cooperate to radiate a beam in space. Further, in Levine, U.S. Pat. No. 4,028,702 issued June 7, 1977, there is disclosed a system for providing the plural variable phase RF signals required to control the beam pointing angle of a phased array. A light energy source (shown as a laser generator) is modulated by an RF signal and fed to a plurality of channels in parallel. Each of the said channels corresponds to one radiating element of the phased array and each channel includes as many selectively employed fiber optic delay lines of different lengths as are required to generate the discrete phases required at the corresponding antenna (radiator) element of the array. A commutating programmer controls the selection of individual radiating element phases for each successive beam pointing position. However, neither of these prior art patents disclose simultaneous plural beam ports combined with true time delay wideband capability. Moreover, both require optical switching. Additional efforts have occurred in the prior art to solve the problems of phased arrays. The Butler beam forming matrix and the Rotman lens are examples of these efforts. These examples were used in microwave systems. The radio frequency signals were intercepted by receivers and coupled to a microwave (RF) structure designed to delay the signals. The Butler and Rotman apparatuses operated on the RF signal directly to provide the requisite delays to properly phase the incoming signals or the transmitted signals in case of a microwave RF transmitter. The major disadvantages were the size, weight and expense associated with this design in addition to the bandwidth limitation inherent in a microwave RF beamforming system. The delay section of the phased array would only operate over a limited frequency range.

SUMMARY OF THE INVENTION

It is therefore an object of the present invention to provide an improved optical beamforming network for phased array antenna systems for providing wideband operation with true time delay beamforming.

It is a further object to provide an improved optical beamforming network for phased array antenna systems having simultaneous multiple beams and simultaneous multiple beam ports on both the transmit and receive sections of the network.

It is a further object to provide an improved optical beamforming network for phased array antenna systems which can be employed in a broad class of antenna systems including linear, circular, planar, cylindrical, spherical and conformal arrays.

It is a further object to provide an improved optical beamforming network for phased array antenna systems capable of employing either single axis beam steering or dual axis beam steering.

It is a further object to provide an improved optical beamforming network for phased array antenna systems having a lightweight, compact size as compared with conventional radio frequency beamforming networks.

It is a further object to provide an improved optical beamforming network for phased array antenna systems providing multiple beamforming capabilities without employing switches or switched phase shifters in the beamforming network.

It is a further object to provide an improved optical beamforming network for phased array antenna systems having a combination of small optical fibers of different lengths for permitting the reception and transmission of signals in multiple directions simultaneously with a separate beam port provided for each direction.

In accordance with the system of the present invention, the above-described and other disadvantages of the prior art are overcome. Briefly, a preferred embodiment of the present invention includes an electro-optical network having a laser in electrical communication with each of a plurality of antenna elements or with each of a plurality of beam ports. The output of the laser is modulated by radio frequency energy which is separated and delayed via optical dividers connected to optical combiners by a plurality of optical fibers of different lengths. The electro-optical network does not require a plurality of optical switches to generate multiple beams or to select a beam. The network provides a true time-delay phased antenna array because substantially all signals arrive in time and phase synchronism at one particular beam port for a receiver intercepting a radio frequency wave at one particular corresponding angle. The electro-optical network is situated between the plurality of beam ports and the plurality of antenna elements for converting the received radio frequency wave to the plurality of in-phase signals at the particular beam port for each respective one of a plurality of directions of wave propagation. In the case of transmitted waves, appropriate radiations from the phased array differ by an amount to effect transmission in one particular direction corresponding to the beam port selected for energization by the transmitter. The direction of a transmitted beam of electromagnetic energy can thus be selectively established at a number of angular positions equal to the number of beam ports. The network includes, but is not limited to, linear or planar phased arrays for receiving or transmitting plane waves. Further, the network can be employed with circular, cylindrical, spherical or conformal arrays for multiple beam generation in one or two axes.

An advantage of the optical beamforming network of the present invention is that a wideband, true time-delay phased antenna array is provided.

Another advantage is that a combination of small optical fibers of different lengths is provided permitting the reception and transmission of signals in multiple directions simultaneously with a separate beam port provided for each direction.

Another advantage is that the optical beam-forming network has simultaneous multiple beams and simultaneous multiple beam ports on both the transmit and receive sections of the network.

Another advantage is that the optical beamforming network can be employed in a broad class of antenna systems including linear, circular, planar, cylindrical, spherical and conformal arrays.

Another advantage is that the optical beamforming network is capable of employing either single axis beam steering or dual axis beam steering.

Another advantage is that the optical beamforming network has a lightweight, compact size as compared with conventional radio frequency beamforming networks.

Another advantage is that the optical beamforming network provides multiple beamforming capabilities without employing switches or switched phase shifters in the beamforming network.

Another advantage is that the optical beamforming network provides a combination of small optical fibers of different lengths permitting the reception and transmission of signals in multiple directions simultaneously with a separate beam port provided for each direction.

These and other objects and advantages of the present invention will no doubt become obvious to those of ordinary skill in the art after having read the following detailed description of the preferred embodiment(s) which are illustrated in the various drawing figures.

BRIEF DESCRIPTION OF THE DRAWINGS

In the accompanying drawings which illustrate exemplary embodiments of the present invention;

FIG. 1 is a diagrammatic view of a plane wave moving toward a linear array of antenna elements;

FIG. 2 is a perspective view of a planar array of antenna elements;

FIG. 3 is a perspective view of a cylindrical array of antenna elements;

FIG. 4 is a side elevational view of a spherical array of antenna elements;

DETAILED DESCRIPTION OF THE PREFERRED EMBODIMENT

Figure 5:
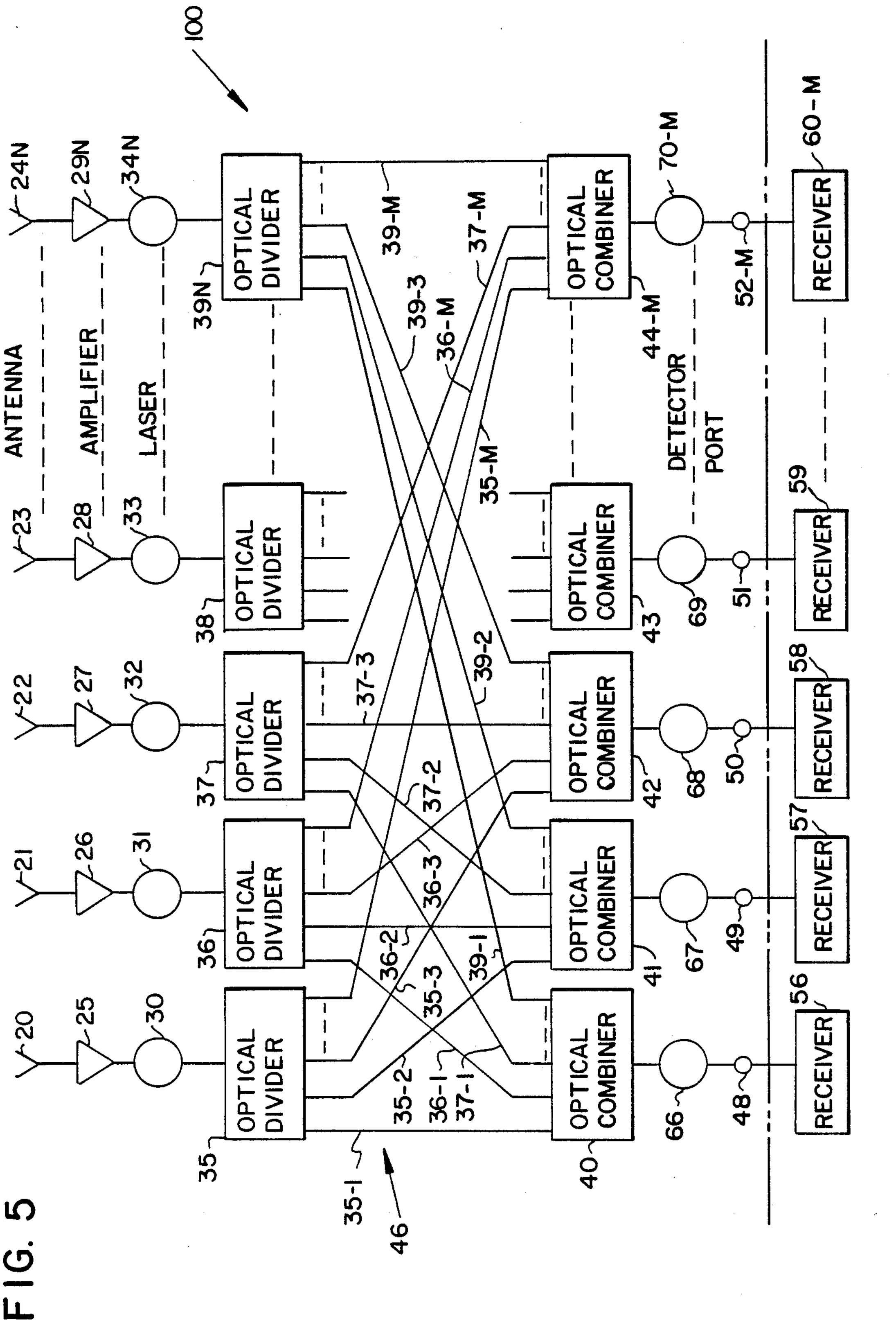
FIG. 5 is a block diagram of a radiant energy receiver constructed in accordance with the present invention.

In FIG. 1 a plane wavefront is illustrated by a line 10 moving at an angle $\theta$ between the wavefront 10 and a linear array of equally spaced antenna elements 11, 12, 13, 14 and 15 or more on a dotted line 16.

Note that wavefront 10 reaches antenna element 11 a time $\Delta t$ later than it reaches antenna element 12 where $$\Delta t = d \sin \theta / c \qquad (1)$$

where d is the antenna element spacing shown in FIG. 1 and c is the velocity of propagation.

All this is old and well known in the prior art. The direction of propagation of the plane wavefront 10 in FIG. 1 is then normal to wavefront line 10. The magnitude of $\Delta t$ then is a sine function of the magnitude of $\theta$.

If all the antenna elements 11–15 are equally spaced, wavefront 10 reaches antenna element 11 at a time period $\Delta t$ after it reaches antenna element 12, a time period $2\Delta t$ after reaching antenna element 13, a time period $3\Delta t$ after reaching antenna element 14 and a time period $4\Delta t$ after reaching antenna element 15.

In order to practice the present invention, as shown diagrammatically in FIGS. 1, 2, 3 and 4, antenna elements 11–15 may be mounted on line 16 (FIG. 1), at a plurality of positions 17 in a plane surface (FIG. 2), at a plurality of positions 18 on the surface of a cylinder (FIG. 3), and at a plurality of positions 19 on the surface of a sphere (FIG. 4).

In FIG. 5, identified by the general reference character 100, a plurality of conventional antenna elements are provided at 20–24N connected to a plurality of conventional radio frequency (RF) low noise amplifiers 25–29N, respectively. If desired, a conventional gallium arsenide monolithic amplifier chip may be employed for each of the RF low noise amplifiers 25–29N. The outputs of amplifiers 25–29N are respectively connected to a plurality of conventional solid state RF modulated diode lasers 30–34N. The outputs of modulated lasers 30–34N are connected respectively to a plurality of conventional optical dividers 35–39N. Also, a plurality of conventional optical combiners 40–44M are provided. A network including a plurality of optical fibers 46 connect the plurality of optical dividers 35–39N to the plurality of optical combiners 40–44M. Network 46 and the direct connections of the plurality of optical fibers (which do not include a corresponding plurality of switches) in combination with the plurality of optical dividers 35–39N and the plurality of optical combiners 40–44M is one of the many novel features of the instant invention. The optical fibers of network 46 are conventional except for their lengths. These lengths are chosen so that all the signals corresponding to a plane wavefront 10 of one direction are in phase at one and only one of a plurality of beam ports 48–52M connected to a respective plurality of receiver means 56–60M via optical detectors 66–70M, respectively.

Lasers 30–34N may provide an RF amplitude modulated light by modulating the voltages thereof as is conventional. The plurality of diode lasers 30–34N are each a coherent light generator providing a light of a singular frequency. The lasers 30–34N each emit a high frequency light wave which acts as a carrier frequency in the light domain. The radio frequency voltages which include frequencies in the range of kilohertz to hundreds of gigahertz occupies only a small percentage of the optical frequency band. The high frequency electromagnetic wave emitted by the lasers 30–34N and acting as a carrier wave is modulated by the radio frequency voltages received at the plurality of antenna elements 20–24N. Once the RF signal voltages are carried into the optical domain, the task of delaying the signals is easier to control. Lasers 30–34N may be of a type made by Ortel Corporation of Alhambra, Caif. Optical dividers 35–39N and optical combiners 40–44M may be conventional and may be of the type made by Canstar of Ontario, Canada including conventional bodies having a graded index of refraction.

Optical dividers 35–39N divide each of the corresponding modulated laser signals into M output signals. Each optical combiner of the plurality of optical combiners 40–44M combines the light outputs of N optical fibers of the network 46. Note that "N" in the context above denotes the number of antenna elements 20–24N while "M" in the context above corresponds to the number of antenna beams simultaneously generated. Thus, for each antenna element 20–24N, an optical divider 35–39N is required, necessitating "N" optical dividers. Since each optical divider 35–39N provides "M" laser signals, then "M" optical fibers must extend from each of the plurality of optical dividers 35–39N since each light signal requires one optical fiber. Each optical fiber extends from one of the "N" optical dividers 35–39N to one of the "M" optical combiners 40–44M since there must be one optical combiners 40–44M for each of the "M" optical signals that are generated. Thus, there are "N" optical fibers received by each of the "M" optical combiners 40–44M. The RF signal at each antenna element 20–24N is sampled by routing one of the "M" optical fibers carrying a signal sample from each of the "N" optical dividers 35–39N to each of the "M" optical combiners 40–44M.

The optical fibers at the output of divider 35 are 35-1, 35-2, 35-3 . . . 35-M. These are connected to combiners 40, 41, 42, 43, . . . 44M, respectively. Dividers 35–39N and combiners 40–44M are all similarly connected by optical fibers. Dividers 36, 37, 38 . . . 39N have optical fibers 36-1, 37-1, . . . 39-1 connected therefrom, respectively, to optical combiner 40, optical fibers 36-2, 37-2 . . . 39-2 are connected to combiner 41, and so forth. The detectors 66–70M are conventional light intensity detectors, i.e. photodiodes. The selection of optical fiber lengths for the network 46 will be described only in connection with beam port 48. The remainder of network 46 may be constructed in an analogous way.

In the case of FIG. 5, if uniformly spaced antenna elements 20–24N were to assume the positions of antenna elements 11–15 (FIG. 1), respectively, and the conditions in FIG. 5 were the same as those in FIG. 1, optical fibers 35-1, 36-1, 37-1 . . . 39-1 must be of lengths to provide time delays of the RF signal envelope of $\Delta t_5$, $\Delta t_6$, $\Delta t_7$, . . . $\Delta t_9$, respectively, where $$\Delta t_6 - \Delta t_5 = \frac{d \sin \theta}{c} \quad (2)$$

$$\Delta t_7 - \Delta t_5 = \frac{2d \sin \theta}{c} \quad (3)$$

.

.

.

$$\Delta t_9 - \Delta t_5 = \frac{(N-1)(d \sin \theta)}{c} \quad (4)$$

where $\Delta t_5$ or the length of fiber 35-1 may provide one degree of freedom and may be chosen as a matter of convenience provided that the lengths of 36-1, 37-1, etc provide the time delay gradient appropriate for the beam direction as given by the above equations (2-4).

Typically, the antenna element spacing $d=\lambda/2$ for linear arrays with uniformly spaced elements.

In FIG. 5, it is a known advantage to determine the direction of propagation of the electromagnetic wave 10 by utilizing receiver means 56–60M to detect the same selectively at the beam ports 48–52M. Each of the beam ports 48–52M is individually positioned to determine the direction of propagation of the approaching electromagnetic wave 10. Thus, each of the beam ports 48–52M that receive the wave 10 are receiving a portion of the RF signal which corresponds to a given beam direction. If the receiver means 56 is connected to beam port 48, a first specific plurality of signals will be received from a first specific direction. Further, if the receiver means 57 is connected to beam port 49. A second specific plurality of signals will be received from a second specific direction. This design applies for each of the remaining receiver means 58–60M. The angles of the specific RF signals received are determined from the length of the individual fibers of network 46 that connect optical dividers 35–39N to optical combiners 40–44M. Each of the fibers act as a time delay device to separately delay the RF signals from each of the antenna elements 20–24N. The goal is to collect each of the individual RF signals at a common point simultaneously. The network of optical fibers 46 is designed to deliver the sample of each of the RF signals received from each antenna element 20–24N to each of the optical combiners 40–44M. Suppose the waveform 10 illustrated in FIG. 1 arrives at an angle $\theta$ (where $\theta=45°$). The RF signal of waveform 10 would be intercepted by the antenna elements 11–15 at different times. If the RF signal is intercepted by antenna element 15 prior to being intercepted by antenna elements 11–14, the optical fibers of network 46 extending between the divider and combiner associated with antenna element 15 will be longer than all the other optical fibers. This design permits the RF signal received by antenna element 15 to be delayed for a longer period. Then one of the fibers extending from each of the optical dividers 35–39N carrying a sample of the RF signal received at the particular angle $\theta$ by each antenna element 20–24N is routed to and combined at a common point. The common point is actually a plurality of common points comprised of optical combiners 40–44M. The output of each optical combiner 40–44M represents a signal arriving from a particular direction. This structure permits each of the beam ports 48–52M to concentrate on a specific beam direction. By generating a plurality of "M" simultaneous beams and by arranging the beams to slightly overlap, a continuous coverage is effected.

Figure 6:
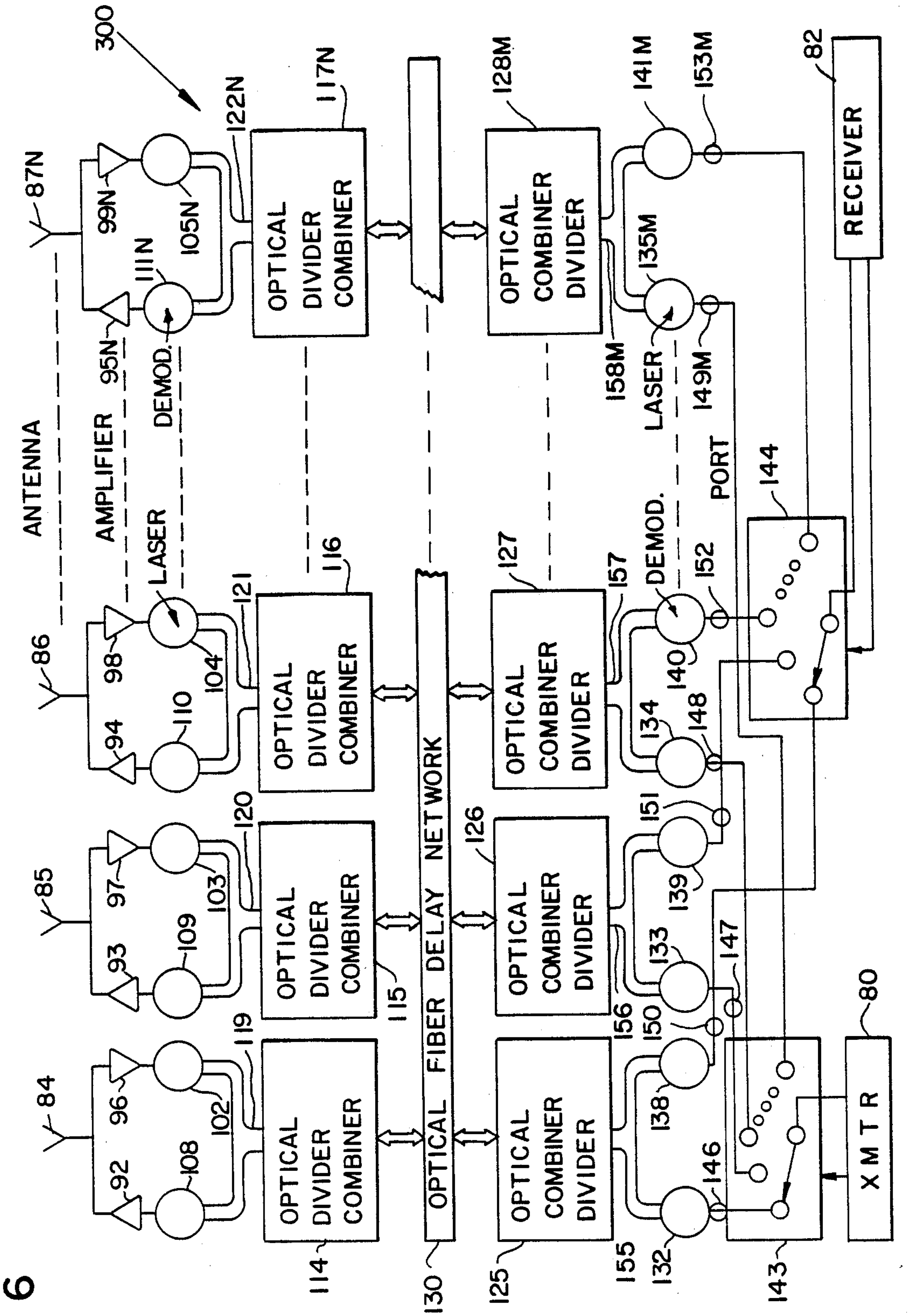
FIG. 6 is a block diagram of a transceiver constructed in accordance with the present invention.
Figure 7:
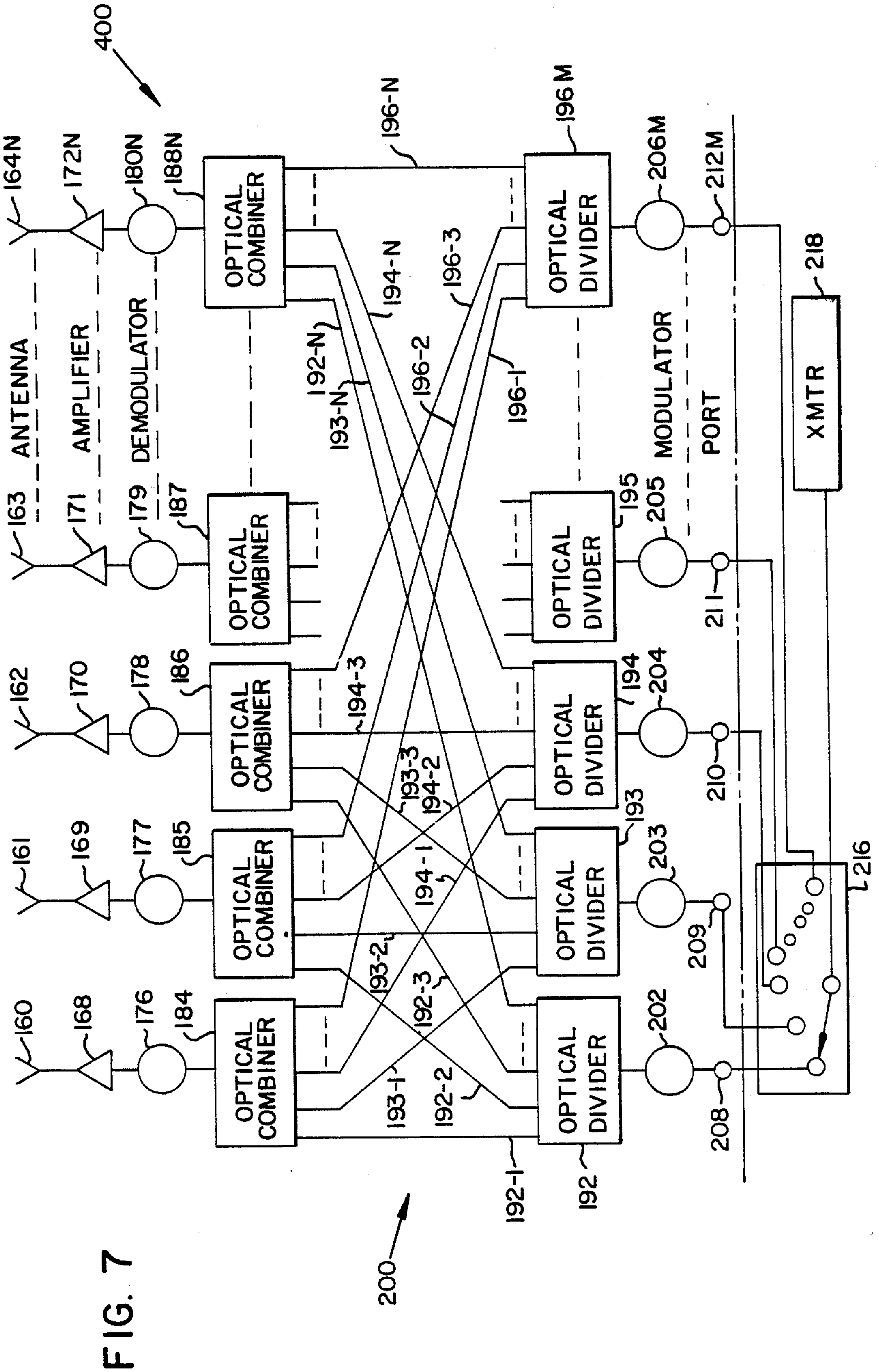
FIG. 7 is a block diagram of a radiant energy transmitter constructed in accordance with the present invention.

FIGS. 6 and 7 are analogous to FIG. 5. FIG. 6 identified by the general reference character 300 illustrates a possible implementation of a transmit and receive capability using a common optical beamforming network. Also shown is a means of commutating a single transmitter and receiver among the plural beam ports. A transmitter is shown at 80 with a receiver shown at 82 in FIG. 6. A plurality of antenna elements 84–87N are provided including a plurality of RF low noise transmit amplifiers 92–95N and a plurality of RF low noise receive amplifiers 96–99N. A plurality of modulated lasers 102–105N and a plurality of light photodiode demodulators 108–111N are connected to a plurality of optical divider-combiners 114–117N with, for example, antenna element 84 in line with divider-combiner 114 through the parallel paths of amplifier 96/modulated laser 102 and amplifier 92/demodulator 108 via one of a plurality of fiber optic "Y's" identified by 119–122N. Each of the divider-combiners 114–117N functions as a divider in the receiver mode but also serves as a combiner in the transmitter mode of operation. Each of the optical divider-combiners 114–117N are connected to one of a plurality of optical combiner-dividers 125–128M through a network of optical fibers 130. Conversely, each of the combiner-dividers 125–128M functions as a combiner in the receiver mode but also serves as a divider in the transmitter mode of operation. The network 130 shown in FIG. 6 may be identical to the network 46 shown in FIG. 5. A plurality of modulated laser diodes 132–135M and a plurality of photodiode demodulators 138–141M are respectively connected to a pair of beam selector switches 143 and 144 via a plurality of transmit beam ports 146–149M and a plurality of receiver beam ports 150–153M respectively. Transmitter 80 and receiver 82 are connected respectively to switches 143 and 144 while the optical combiner-dividers 125–128M are connected to the modulated laser diodes 132–135M and the demodulator photodiodes 138–141M via a plurality of fiber optic "Y's" 155–158M.

The receiver mode of operation in FIG. 6 operates in a similar manner as was described for FIG. 5. The RF signal wavefront 10 is received by the antenna elements 84–87N and amplified by amplifiers 96–99N. The amplified RF signals modulate the conventional laser diodes 102–105N. In the receiver mode, the RF modulated light signal passes through the plurality of fiber optic "Y's" 119–122N to the "N" optical divider-combiners 114–117N which function as optical dividers. A plurality of "M" simultaneous beams are formed as described in FIG. 5 by the optical fiber delay network 130, the optical combiner-dividers 125–128M (which function as optical combiners) and the photodiode demodulators 138–141M which demodulate the combined phased optical signal. Switch 144 can be used to select the desired beam port if only single beam reception is desired. If simultaneous reception of multiple beams is desired, separate receivers can be connected to each beam port. In essence, the RF waveform 10 is converted from the radio frequency domain to the optical domain for beam forming purposes and then the optical signal is converted back to the radio frequency domain after beamforming. This results in a beamforming system which is lightweight and compact in size since the optical components (consisting of laser diodes, combiner/dividers, optical fibers and detector photodiodes) are very small and lightweight. Further, the beamforming system results in a very wide bandwidth capability for two reasons. First, the use of an optical carrier frequency and optical components intrinsically provide operating bandwidths which are much wider than are generally possible at radio or microwave frequencies. Second, the beamforming system described herein is a true time-delay system wherein the time delays provided by the optical fibers remain constant independent of radio or microwave modulating frequencies. Thus, the antenna and beamforming system provides not only a broad operating frequency range but also provides capability for distortion-free processing of signals having wide instantaneous bandwidth. The bandwidth of a phased array antenna system as described herein is limited only by the bandwidths of the RF and microwave components such as the RF radiator elements, RF amplifiers and their interface connections to the optical beamforming system and not by the optical beamformer. Monolithic gallium arsenide RF amplifiers currently available today, however, are capable of bandwidths of several octaves. Thus, the ultimate bandwidth limit is controlled by the antenna RF radiating elements.

In the transmit mode of operation, the transmitter 80 delivers a desired RF waveform signal to one of the plurality of convention RF modulated laser diodes 132–135M via beam selector switch 143 and transmit beam ports 146–149M. The RF signal is modulated by the selected modulator 132–135M, converting the RF signal into a modulated light signal in the optical domain. The optical signal is then transmitted to the selected optical combiner-divider 125–128M via one of the fiber optic "Y's" 155–158M. The selected optical combiner-divider 125–128M functions as a divider and divides the light modulated signal into "N" light signals. The "N" light signals are transmitted through the optical fiber delay network 130 to the plurality of optical divider-combiners 114–117N which function as combiners in the transmit mode. The divider-combiners 114–117N transmit the "N" light signals to the plurality of demodulator photodiodes 108–111N which provide the RF waveform signal 10 to the plurality of transmit amplifiers 92–95N and to antenna elements 84–87N.

FIG. 7 identified by the general reference character 400 illustrates a transmit antenna implementation using the optical beamforming system. The transmission system of FIG. 7 may be identical to the transmit portion of FIG. 6 except that certain components have been omitted. The components that have been omitted are the receiver 82, the receiver amplifiers 96–99N, the modulator laser diodes 102–105N, the demodulator photodiodes 138–141M and the beam selector switch 144. The transmit system of FIG. 7 is a special implementation of the transmitter-receiver (transceiver) of FIG. 6. The transmit system of FIG. 7 includes a plurality of antenna elements 160–164N connected to a plurality of RF power transmit amplifiers 168–172N. Each amplifier 168–172N is connected to one of a plurality of demodulator photodiodes 176–180N which are in turn each connected to one of a plurality of optical combiners 184–188N. Each of the plurality of optical combiners 184–188N is connected to a plurality of optical dividers 192–196M through a network of optical fibers 200. Each of the plurality of optical dividers 192–196M is in turn connected to one of a plurality of laser diode modulators 202–206M which are in turn each connected to one of a plurality of beam ports 208–212M connected within a transmit beam selector switch 216 in series with a transmitter 218.

The transmitter 218 provides an RF transmission signal to the transmit beam selector switch 216 which selects which of the plurality of beam ports 208–212M is connected to the plurality of antenna elements 160–164N. The selected beam port 208–212M transmits the RF signal to the corresponding laser diode modulator 202–206M where the RF signal modulates the laser optical carrier frequency signal and delivers the modulated light signal to the corresponding optical divider of the "M" optical dividers 192–196M. The selected optical divider 192–196M divides the modulated light signal into "N" optical signals, one signal sample to be transmitted to each of the "N" optical combiners 184–188N via the network of optical fibers 200. The optical fibers at the output of divider 192 are 192-1, 192-2, 192-3 . . .

192-N individually connected to combiners 184, 185, 186 . . . 188N respectively. Further, dividers 193–196M are individually connected to the "N" optical combiners 184–188N via optical fibers 193-1 to 193-N, 194-1 to 194-N, 195-1 to 195-N and 196-1 to 196-N. Each of the "N" optical combiners 184–188N receives "M" optical fibers and combines the "M" light signal samples from the "M" optical fibers. Then each optical combiner 184–188N delivers a combined sample light signal to each of the photodiode demodulators 176–180N. Each demodulator 176–180N demodulates the combined sample light signal providing an RF signal which is amplified by the power amplifiers 168–172N and radiated by antenna elements 160–164N. Although the transmit system shown in FIG. 7 with a single transmitter commutated among the several beam ports 208–212M is capable of generating only one single beam at a time, it is easily seen that the use of multiple transmitters, one at each beam port, would provide the capability of generating simultaneous multiple transmit beams if so desired. In the latter case, each of the transmitters could operate at a different frequency to enhance beam to beam isolation and selectivity.

Further, it is evident that although the diagrams of FIGS. 5, 6 and 7 show a uniform amplitude weighting for the described beamforming system, special amplitude weightings are easily provided to yield beam patterns with low sidelobes by providing appropriate attenuators in the optical fiber lines to achieve optimal signal amplitude weightings on transmit and receive.

Although the present invention has been described in terms of the presently preferred embodiment(s), it is to be understood that such disclosure is not to be interpreted as limiting. Various alterations and modifications will no doubt become apparent to those skilled in the art after having read the above disclosure. While the above description of the optically controlled phased array has been illustrated for linear arrays providing multiple beams along one axis only, the basic principle can be readily applied to two axis beamforming antennas having various configurations such as planar, circular, cylindrical, spherical and conformal arrays. Accordingly, it is intended that the appended claims be interpreted as covering all alterations and modifications as fall within the true spirit and scope of the invention.

What is claimed is:

1. In a radiant energy receiving system, the combination comprising; a plurality of N antenna elements for producing radio frequency (RF) signals of different phases as a function of an angle of inclination of the same wavefront of an electromagnetic wave; N sets of an RF amplifier and a light modulator connected in succession from each respective one of said antenna elements, each modulator including a laser for producing a light output intensity modulated in accordance with the RF signal appearing at the output of the amplifier connected thereto; first, second, third . . . $N^{th}$ optical dividers connected from respective ones of said modulators; a beam port corresponding to each one of a plurality of M different wavefront angles; receiver means connected from each beam port; a light intensity demodulator connected to each beam port; first, second, third . . . $M^{th}$ optical combiners connected to respective ones of said light intensity demodulators, each optical divider having a set of first, second, third . . . $M^{th}$ optical fibers connected thereform, said first, second, third . . . $M^{th}$ optical fibers of said first optical divider being connected from said first optical divider to said first, second, third . . . $M^{th}$ optical combiners, respectively; said first, second, third . . . $M^{th}$ optical fibers of said second optical divider being connected from said second optical divider to said first, second, third . . . $M^{th}$ optical combiners, respectively; said first, second, third . . . $M^{th}$ optical fibers connected from said third optical divider to said first, second, third . . . $M^{th}$ optical combiners, respectively, . . . said $N^{th}$ optical divider having first, second, third . . . $M^{th}$ optical fibers connected therefrom to said first, second, third . . . $M^{th}$ optical combiners, respectively; all of said first optical fibers having lengths different from each other, all of said second optical fibers having lengths different from each other, all of said third optical fibers having lengths different from each other, . . . and all of said $M^{th}$ optical fibers having lengths different from each other; said optical fibers having lengths chosen to cause signals appearing at one of said first, second, third . . . $M^{th}$ beam ports to arrive simultaneously and be in phase for received plane waves of first, second, third . . . $M^{th}$ beam angles, respectively.

2. The radiant energy receiving system of claim 1 in which each said demodulator includes a conventional photodiode detector.

3. The radiant energy receiving system of claim 1 wherein each of said amplifiers of said plurality of "N" amplifiers is comprised of a gallium arsenide amplifier chip.

4. The radiant energy receiving system of claim 1 wherein said set of optical fibers provides a direct connection between said plurality of optical dividers and said plurality of optical combiners.

5. The radiant energy receiving system of claim 1 wherein each of said "N" optical dividers has "M" optical fibers extending therefrom, each of said "M" optical fibers being routed to one of said "M" optical combiners with each of "M" optical fibers carrying one of "N" optical signals derived from the radio frequency signals of each of said "N" antenna elements.

6. The radiant energy receiving system of claim 1 wherein each of said plurality of "M" beam ports is arranged to intercept a radio frequency signal wavefront corresponding to a specific beam direction for determining the direction of propagation of said wavefront.

7. The radiant energy receiving system of claim 1 wherein each fiber of said set of optical fibers having said particularized length with each length being chosen such that each of the signals corresponding to said wavefront of a single direction are in time and phase synchronism at one and only one of said plurality of "M" beam ports, said lengths of fiber providing a required time delay for said time and phase synchronism.

8. The radiant energy receiving system of claim 7 wherein the difference in lengths of said fibers for providing said time delay for a linear array is described by the general formula $\Delta t\beta - \Delta t\alpha = (N-1)\ (d \sin \theta)/c$ where ($\Delta t\beta$) is the time delay due to the length of the fiber ($\beta$), ($\Delta t\alpha$) is the time delay due to the length of the fiber ($\alpha$). "N" comprises the set of optical fibers, "d" is the antenna element spacing, "$\theta$" is the angle of inclination of said wavefront and "c" is the speed of light.

9. The radiant energy receiving system of claim 8 wherein said wavefront is intercepted by a first antenna element of said plurality of "N" antenna elements and wherein said fibers of said set of optical fibers extend between a first divider of said plurality of optical dividers and a first combiner of said pluralit of optical combiners associated with said first antenna element, said fibers connecting said first antenna element to said first divider being of greater length than the remaining fibers of said plurality of optical fibers for providing a longer time delay in said linear array.

10. The radiant energy receiving system of claim 9 wherein each of said "N" antenna elements has an antenna spacing "d" equal to λ/2.

11. The radiant energy receiving system of claim 1 wherein each of said receiver means at each of said beam ports provides for simultaneous reception of said RF signals at "M" beam directions.

12. The radiant energy receiving system of claim 1 further including a means for commutating a single receiver among the plurality of beam ports is connected between said receiver means and said beam ports.

13. The radiant energy receiving system of claim 12 wherein said means for commutating a single receiver among the plurality of beam ports comprises a selector switch.

14. In a radiant energy transmitting system, the combination comprising: a plurality of N antenna elements for radiating electromagnetic waves at first, second, third . . . $M^{th}$ angles of radio frequency (RF) signals; N sets of an amplifier and a light intensity demodulator connected in succession to each respective one of said antenna elements; first, second, third . . . $N^{th}$ optical combiners connected to respective ones of said demodulators; a beam port respectively corresponding to each one of said plurality of M different wavefront angles; transmitter means connected to each beam port; a light intensity modulator connected from each beam port; first, second, third . . . $M^{th}$ optical dividers connected from respective ones of said light intensity modulators, each optical divider having a set of first, second, third . . . $N^{th}$ optical fibers connected therefrom; said first, second, third . . . $N^{th}$ optical fibers of said first optical divider being connected from said first optical divider to said first, second, third . . . $N^{th}$ optical combiners, respectively; said first, second, third . . . $N^{th}$ optical fibers of said second optical divider being connected from said second optical divider to said first, second, third . . . $N^{th}$ optical combiners, respectively; said first, second, third . . . $N^{th}$ optical fibers connected from said third optical divider to said first, second, third . . . $N^{th}$ optical combiners, respectively, . . . said $M^{th}$ optical divider having first, second, third . . . $N^{th}$ optical fibers connected therefrom to said first, second, third . . . $N^{th}$ optical combiners, respectively, all of said first optical fibers having lengths different from each other, all of said second optical fibers having lengths different from each other, all of said third optical fibers having lengths different from each other, . . . and all of said $N^{th}$ optical fibers having lengths different from each other; said optical fibers having lengths chosen to cause signals applied at one of said first, second, third . . . $M^{th}$ beam ports to be translated into signals at said antenna elements to product plane waves propagated at said first, second, third . . . $M^{th}$ angles, respectively.

15. The radiant energy transmitting system of claim 14 wherein means for commutating a single transmitter among the plurality of beam ports is connected between said transmitter and said beam ports which comprises a selector switch.

16. The radiant energy transmitting system of claim 14 wherein each of said transmitter means at of said "M" beam ports provides for simultaneous transmission of said RF signals at "M" beam directions.

17. In a radiant energy receiving and transmitting system, the combination comprising:

a plurality of "N" antenna elements for providing radio frequency signals of different phases as a function of an angle of inclination of the same wavefront of an electromagnetic wave and for radiating electromagnetic waves at a first, second, third . . . $M^{th}$ angles of radio frequency signals;

a plurality of "N" sets of a first amplifier and a first light modulator connected in succession from each respective one of said plurality of antenna elements, each modulator including a laser for producing a light output intensity modulated in accordance with the radio frequency signal appearing at the output of the amplifier connected thereto;

a plurality of "N" sets of a second amplifier and a first intensity demodulator connected in succession to each respective one of said plurality of antenna elements;

a plurality of first, second, third . . . $N^{th}$ optical divider-combiners connected from respective ones of said first light modulators and demodulators for dividing and combining said modulated light;

a plurality of "M" beam ports for receive and "M" beam ports for transmit with each beam port corresponding to one of a plurality of "M" different radiant wavefront angles;

a receiver means connected from each receive beam port for receiving said radio frequency signals and a transmitter means connected to each transmit beam port for transmitting said radio frequency signals;

a plurality of second light intensity demodulators, each second demodulator connected to one of said plurality of receive beam ports for demodulating said radio frequency signals and a plurality of second light intensity modulators, each second modulator connected to one of said plurality of transmit beam ports for modulating said radio frequency signals;

a plurality of first, second, third . . . $M^{th}$ optical combiner-dividers connected to respective ones of said second light intensity demodulators and said second light intensity modulators for dividing and combining said modulated light; said plurality of optical divider-combiners having a set of first, second, third . . . $M^{th}$ optical fibers connected therefrom; said first, second, third . . . $M^{th}$ optical fibers of said first optical divider-combiner being connected from said first optical divider-combiner to said first, second, third . . . $M^{th}$ optical combiner-dividers, respectively; said first, second, third . . . $M^{th}$ optical fibers of said second optical divider-combiner being connected from said second optical divider-combiner to said first, second, third . . . $M^{th}$ optical combiner-dividers, respectively; said first, second, third . . . $M^{th}$ optical fibers connected from said third optical divider-combiner to said first, second, third . . . $M^{th}$ optical combiner-dividers, respectively; . . . said $N^{th}$ optical divider-combiner having first, second, third . . . $M^{th}$ optical fibers connected therefrom to said first, second, third . . . $M^{th}$ optical combiner-dividers, respectively; all of said first, second, third . . . $M^{th}$ optical fibers having lengths different from each other; said optical fibers having lengths chosen for appropriate time delays to cause signals appearing at one of said first, second, third . . . $M^{th}$ beam ports to be in time and phase synchronism for received plane waves of first, second, third . . . $M^{th}$ angles, respectively.

18. The radiant energy receiving and transmitting system of claim 17 wherein each of said plurality of optical divider-combiners provides an optical divider during the receive mode of operation and provides an optical combiner during the transmit mode of operation.

19. The radiant energy receiving and transmitting system of claim 17 wherein each of said plurality of optical combiner-dividers provides an optical divider in the transmit mode of operation and provides an optical combiner in the receive mode of operation.

20. The radiant energy receiving and transmitting system of claim 17 further including a plurality of light splitters, each light splitter connected between one of said plurality of "N" optical divider-combiners and a parallel combination of said first light modulator and said first light demodulator.

21. The radiant energy receiving and transmitting system of claim 17 further including a plurality of light splitters, each light splitter connected between one of said plurality of "M" optical combiner-dividers and a parallel combination of said second light modulator and said second light demodulator.

* * * * *